United States Patent
Hedberg

(10) Patent No.: US 6,292,014 B1
(45) Date of Patent: Sep. 18, 2001

(54) OUTPUT BUFFER CIRCUIT FOR TRANSMITTING DIGITAL SIGNALS OVER A TRANSMISSION LINE WITH PREEMPHASE

(75) Inventor: Mats Hedberg, Haninge (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/325,529

(22) Filed: Jun. 3, 1999

(30) Foreign Application Priority Data

Jun. 5, 1998 (DE) .............................................. 198 25 258

(51) Int. Cl.[7] .......................................... H03K 19/0185
(52) U.S. Cl. ................................ 326/30; 326/21; 326/26; 326/34; 326/56; 326/83; 327/317; 327/108; 327/318; 327/379; 327/374; 327/520
(58) Field of Search ................................ 326/21, 26, 30, 326/34, 56, 83; 327/108, 317, 318, 379, 374, 520; 365/189.05, 230.08

(56) References Cited

U.S. PATENT DOCUMENTS

| | | | | |
|---|---|---|---|---|
| 4,847,550 | * | 7/1989 | Tanaka et al. | 323/313 |
| 5,057,699 | * | 10/1991 | Spence | 307/98 |
| 5,243,229 | * | 9/1993 | Gabara et al. | 307/98 |
| 5,608,352 | * | 3/1997 | Itakura | 330/352 |
| 5,864,254 | * | 1/1999 | Tashiro | 327/319 |
| 5,955,918 | * | 9/1999 | Uno | 330/9 |
| 5,963,047 | * | 10/1999 | Kwong et al. | 326/27 |
| 6,144,580 | * | 11/2000 | Murray | 365/185.01 |
| 6,166,570 | * | 12/2000 | Hedberg | 327/108 |

* cited by examiner

Primary Examiner—Viet Q. Nguyen
(74) Attorney, Agent, or Firm—Jenkens & Gilchrist, A Professional Corporation

(57) ABSTRACT

The present invention relates to an output buffer circuit for transmitting digital signals over a transmission line with pre-emphase. It comprises an output stage and a control circuit. The output stage includes a first impedance circuit connected between an upper power supply potential and an output node. It furthermore includes a second impedance circuit connected between the output node and a power supply node at a lower supply potential. Both impedance circuits receive impedance control signals from the control circuit such that an impedance ratio between the first impedance and the second impedance takes one of at least three different predetermined values in accordance with the present state and the history of a digital data input signal, and such that the sum of the conductance provided by the first impedance circuit and the conductance provided by the second impedance circuit is independent from the generated impedance ratios. Preferably, both impedance circuits consist of a plurality of transistors connected in parallel. For each transistor in the first impedance circuit there exists a corresponding transistor in the second impedance circuit. Pairs of corresponding transistors are designed to have the same ON-impedance. The control circuit controls the first and the second impedance circuit such that in each pair one transistor is in the ON state and the other transistor is in the OFF state at any time.

9 Claims, 4 Drawing Sheets

OUTPUT BUFFER CIRCUIT FOR TRANSMITTING DIGITAL SIGNALS OVER A TRANSMISSION LINE WITH PREEMPHASE

TECHNICAL FIELD OF THE INVENTION

The present invention relates to an output buffer circuit for transmitting digital signals over a transmission line with preemphase.

DESCRIPTION OF RELATED ART

Digital communication systems have experienced an enormous growth in complexity and operating speed. This results in increasing demands on those system components which serve to interface different system sections with each other. Within a digital system, transmission lines are an appropriate means for interconnecting system sections with each other. Depending on the operating speed, traces on a printed circuit board with the length of a few centimeters must be treated as a transmission line in order to avoid distortion of the transmitted digital signals due to mismatch conditions of the output buffer circuit driving the transmission line and the input buffer circuit receiving the transmitted signals at the other end of the line. Distortions of the transmitted signal due to reflections can be reduced and the data transmission speed can be increased if also the source impedance of the output buffer circuit matches the characteristic impedance of the transmission line.

It is a well known problem with bandwidth limited media, e.g. real transmission lines like cable, printed circuit board traces etc., that when increasing the transmission speed or the length of the transmission media, the signal at the receiver end will deteriorate even if no mismatch condition is present. Such deterioration results from the fact that higher frequency components of the signal suffer from a higher loss in the media than signal components with lower frequencies. This non-uniform loss characteristic of the transmission media distorts the shape of transmitted digital signals at the receiver end of the media. For instance, a single digital zero or one will not reach its full signal amplitude at the receiver's end, which might lead to errors in the detection of the logical level of the signal. This distortion of the signal symbols used for transmitting logical levels, can also be called data dependent distortion or intersymbol interference.

There exist well known methods of compensating the adverse effects of the transmission media on the transmitted signal. One of such methods is, to apply a preemphase distortion to the signal in the output buffer driving the line. The pre-emphase distortion of the transmitted signal takes into account the frequency dependent losses of the signal in the transmission media such that at the receiver end the adverse effect of intersymbol interference can be alleviated or compensated. A well known, simple way to provide a pre-emphase distortion is, to increase the signal amplitude of a single digital zero or a single digital one in order to compensate the distortion of the single symbols at the receiver end. An output buffer circuit with the ability to provide a pre-emphase on the output signal, determines the output amplitude dependent on the present logical level of the data input signal to be transmitted, and the history of the data input signal, e.g. the logical level of the data input signal one bit clock period ago.

From U.S. Pat. No. 5,243,229 an output buffer circuit is known, that delivers a digital signal to a transmission line. The known circuit is able to generate a binary signal with a digitally adjustable source impedance. The known circuit consists of a series connection of two digital impedances. In accordance with a data input signal, one of these digital impedances is active while the other digital impedance is inactive, i.e. in a high impedance state. Both digital impedances are controlled such that their impedance values in the active state are equal. Each digital impedance consists of a parallel connection of MOSFET transistors. A control circuit is provided which activates as many of the MOSFETs as necessary for achieving the target impedance in the active state. However, outputting a signal with pre-emphase requires, that the output buffer circuit is able to generate more than two distinct output signal levels. The circuit known from this document is not able to meet this objective.

SUMMARY OF THE INVENTION

It is the object of the present invention, to provide an output buffer circuit for driving a transmission line that is able to generate an output signal for transmission with a pre-emphase distortion and with a constant output impedance.

According to the present invention, this object is solved as defined in the independent patent claims. Advantageous embodiments of the present invention are given in the dependent claims.

An output buffer circuit according to an embodiment of the present invention comprises an output stage that includes a first impedance circuit and a second impedance circuit. The first impedance circuit is connected to provide a first impedance between an upper power supply node and an output terminal for connection with the transmission line, the first impedance being controllable in accordance with a first impedance control signal. The second impedance circuit is connected to provide a second impedance between a lower power supply node and said output terminal. The second impedance is controllable in accordance with a second impedance control signal. A control circuit is provided for receiving a digital data input signal and for generating the impedance control signals for the first impedance circuit and the second impedance circuit, in accordance with said digital data input signal. The control circuit generates the impedance control signals for the first impedance circuit and the second impedance circuit such that the ratio of the first impedance and the second impedance can take one of at least three different predetermined values, in accordance with the present state and the history of the digital data input signal, in order to generate an output signal for the transmission line with a pre-emphase distortion. Moreover, the control circuit generates the impedance control signals for the first impedance circuit and for the second impedance circuit such that the sum of the conductance provided by the first impedance circuit and the conductance provided by the second impedance circuit, is independent from the generated impedance ratios.

If the sum of the conductances of the first impedance circuit and the second impedance circuit, i.e. the sum of the inverse of the first impedance and the inverse of the second impedance, is the same for all impedance ratios generated under control of the control circuit, the output impedance of the output buffer circuit will be substantially constant for all generated signal levels occurring in the output signal with pre-emphase.

Preferably, each impedance circuit comprises a plurality of transistors having their drain source paths connected in parallel. The transistors receive at their gates individual control signals for turning the respective transistor OFF or ON. The ON resistance of the transistor is determined by physical design parameters of the transistor, e.g. the channel width and the channel length of the transistor.

Preferably, the parallel connected transistors of each impedance element are designed such that their respective ON impedances are in a binary relation with each other, i.e. the ON impedance of the n-th transistor of each impedance element is equal to $2^{n-1}$ times the ON impedance of transistor 1 of that impedance circuit. This can e.g. be achieved by means of designing the transistors of each impedance circuit such that $W(n)=2^{-(n-1)} \cdot W(1)$, W(n) being the channel width of transistor element n of the impedance circuit.

Preferably, the impedance circuits of the output stage comprise similar sets of transistors. Transistors corresponding to each other in the first impedance circuit and in the second impedance circuit which have the same properties, are preferably driven such that the transistor in one impedance circuit is switched OFF when the corresponding transistor in the other impedance circuit is switched ON, e.g. by means of driving the gates of corresponding transistors of the first impedance circuit and the second impedance circuit with control signals which are complementary to each other. This ensures in a simple manner that the sum of the conductances of the first impedance circuit and the second impedance circuit remains the same, independent from the impedance ratio of the first impedance circuit and the second impedance circuit.

BRIEF DESCRIPTION OF THE DRAWINGS

In the following, preferred embodiments of the present invention will be described with reference to the accompanying drawings.

DETAILED DESCRIPTION OF THE DRAWINGS

Figure 1:
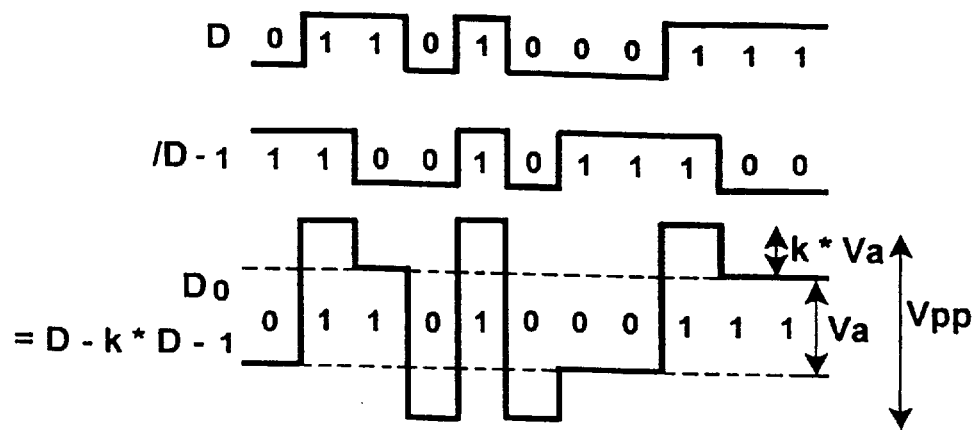
FIG. 1 shows an example of an output signal with pre-emphasis generated by an output buffer circuit according to the present invention in accordance with a data input signal and the history of the data input signal.

FIG. 1 shows an example of an output signal with pre-emphasis, generated by an output buffer circuit according to the present invention. In FIG. 1, reference sign D denotes a data input signal consisting of a sequence of binary levels 0 and 1. Reference symbol/$D_{-1}$ denotes the inverted data input signal D, delayed by one bit clock period. Reference numeral Do denotes an output signal with pre-emphasis generated by the output buffer circuit, for driving a transmission line. In this particular example, the output signal Do takes one of four different output levels, depending on the data input signal D and the history $D_{-1}$ of the data input signal. Since in this embodiment only the input data history $D_{31\ 1}$ one bit clock period ago is taken into account, the output signal Do has a pre-emphasis of first order. This pre-emphasis signal of first order provides an enlarged signal amplitude during bit periods immediately following a change of level of the input signal D. Subsequent bits of the same logical level will result in Do taking the normal output level.

The first order pre-emphasis signal Do shown in FIG. 1 can be generated in a number of different ways. A simple circuit for generating a first order pre-emphasis output signal Do consists of a delay element, a multiplication element for multiplying an input value by a factor (−k), and an adder having two inputs. The data input signal D is applied to one of the inputs of the adder and to the delay element which provides a delay of one bit clock period. The output of the delay element is input to the multiplication element where it is multiplied by (−k), k determining the amount of pre-emphasis in the output signal Do. The output signal of the multiplier is fed into the second input of the adder. The output of the adder provides the first order pre-emphasis signal Do=$D^- k \cdot D_{-1}$. The output signal Do output by the adder may be represented by an output level control word of n bits, n being a positive integer, for controlling the output level of the output buffer circuit.

Depending on the frequency dependent loss characteristic of the media to be compensated by means of pre-emphasis, a pre-emphasis circuit of an order higher than 1 may be required. A pre-emphasis circuit of higher order requires a longer data input history. A data output signal Do with a pre-emphasis of an order i higher than 1 can be obtained in a straight forward fashion simply by providing a plurality of delay elements for delaying the data input signal D by respective multiples of the bit clock period, and by adding the data input signal D and the weighted outputs of the delay elements, resulting in an output signal Do=$D-k_1 D_{-1}-k_2 D_{-2}-\ldots -k_i D_{-i}$ with higher order pre-emphasis and m different output levels represented by an n bit output level control word.

Figure 2:
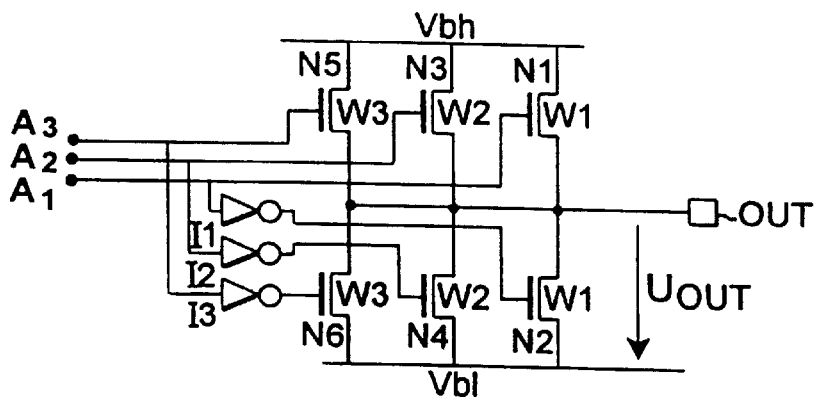
FIG. 2 shows an embodiment of an output buffer circuit according to the present invention.

FIG. 2 shows a first embodiment of an output buffer circuit according to the present invention.

This output stage comprises a first impedance circuit which in this embodiment consists of transistors N1, N3 and N5 having their drain source paths connected in parallel. The drains of transistors N1, N3 and N5 are connected with a power supply node Vbh supplying an upper power supply potential. The source of transistors N1, N3 and N5 is connected with an output terminal Out of the output stage, for connection with a transmission line not shown in FIG. 2.

The output stage of this embodiment moreover comprises a second impedance circuit which in this embodiment consists of transistors N2, N4 and N6 having their drain source paths connected in parallel. The drains of transistors N2, N4 and N6 are connected to the output terminal Out while the sources of transistors N2, N4 and N6 are connected to a second power supply node at a lower power supply potential Vb1. W1 to W3 in FIG. 2 indicates the channel widths of the transistors N1 to N6. For each transistor in the first impedance circuit there exists a transistor with a corresponding channel width in the second impedance circuit. Specifically, transistor N2 corresponds to transistor N1. Transistor N4 corresponds to N3 and transistor N6 corresponds to N5. Preferably, the channel widths W1 to W3 are preferably selected according to W3=2×W2=4×W1 to achieve a binary weighted relation among the ON resistances of the transistors of each of the first and the second impedance circuit of FIG. 2.

I1 to I3 denote inverters for inverting respective digital control signals A1 to A3 of a three bit output level control word provided by a control circuit the function of which has been described in connection with FIG. 1. The three bit output level control word represents the signal amplitude of an output signal Do having a pre-emphasis. The inverter I1 has its input connected with the gate of transistor N1 and its output connected with the gate of transistor N2. The inverter I2 has its input connected with the gate of transistor N3 and its output with the gate of transistor N4. The inverter I3 has its input connected with the gate of transistor N5 and its output with the gate of transistor N6. In this way, the inverters I1 to I3 ensure, that in each of the three pairs of corresponding transistors of FIG. 2, one of the two transistors is in the ON-state while the other transistor of the pair is OFF, i.e. in a high impedance state. The provision and connection of the inverters I1 to I3 according to this embodiment results in that regardless the value of the output level control word (A3, A2, A1), the output impedance at the output terminal Out of the output stage of FIG. 2 has a constant value, preferably in accordance with the characteristic impedance of the transmission line connected to the output terminal Out. The output impedance is determined by the sum of the conductances of all transistors of the output stage in the ON-state, which is constant due to the provision of the inverters I1 to I3 and the presence of pairs of transistors corresponding to each other in the first impedance circuit and in the second impedance circuit. Of course, instead of the inverters I1 to I3 other circuits may be adopted for controlling the transistors N1 to N6 in the manner indicated.

Figure 3:
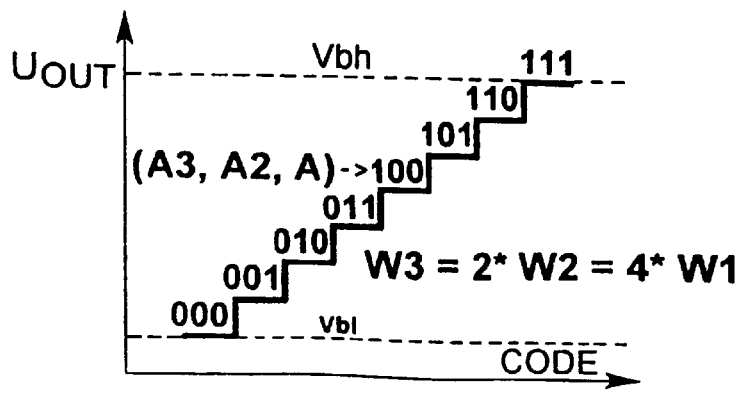
FIG. 3 shows a diagram representing the output voltage of the embodiment of FIG. 2 as a function of a digital multi-bit control signal.

FIG. 3 shows the output voltage Uout if no load is connected across the output of the output stage of FIG. 2, depending on the value of the output level control word (A3,A2,A1). If the channel width W1 to W3 of the transistors N1 to N6, as shown in FIG. 2, is designed such that W3=2×W2=4×W1, i.e. in a binary weighted relation to each other, then the output voltage Uout is adjustable between Vbl and Vbh in eight steps of equal size, the source impedance being the same for all the eight different output levels of Uout.

While the output stage of FIG. 2 and the graph of Uout versus the output level control word at the inputs A1 to A3 of the output stage was shown for the particular case of a three bit output level control word, it is readily apparent that depending on the desired order of the pre-emphase of the output signal Do, the output level control word may comprise n bits A1 to An, n being greater than or equal to 2, n transistors, e.g. with channel widths W1 to Wn in a binary weighted relation to each other, being provided in each of the first and the second impedance circuit of the output stage of FIG. 2.

Figure 4:
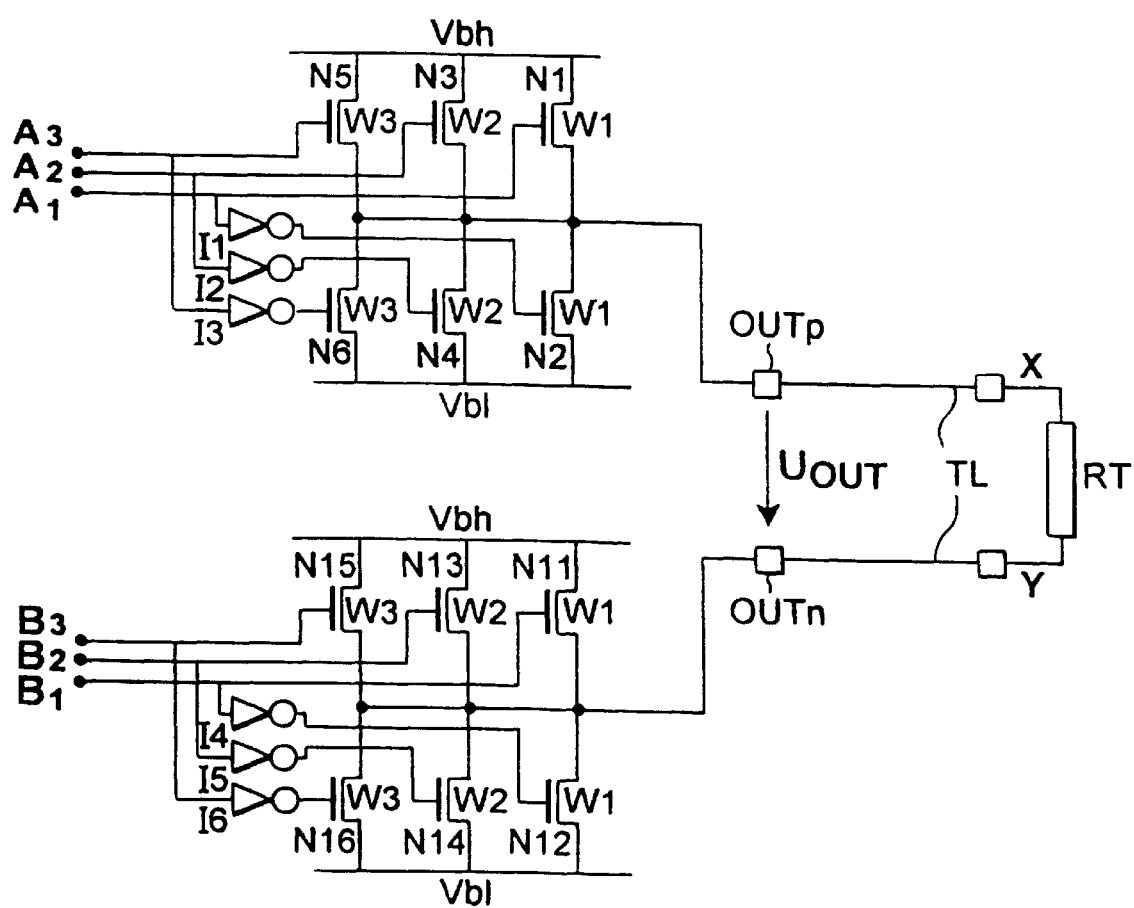
FIG. 4 shows a second embodiment of an output buffer circuit according to the present invention.

FIG. 4 shows a second embodiment according to the present invention, for driving a symmetrical transmission line TL. Elements in FIG. 4 which correspond to elements shown in FIG. 2, are denoted with the same reference signs. With regard to these elements, reference is made to the description given for FIG. 2 in order to avoid repetitions.

The embodiment of FIG. 4 comprises a first output stage with a structure similar to that shown in FIG. 2. The first output stage of FIG. 4 comprises the transistors N1 to N6 and the inverters I1 to I3. With regard to these elements, reference is made to the description given for FIG. 2. The sources of transistors N1, N3 and N5 and the drains of the transistors N2, N4 and N6 are connected with an output terminal Outp for connection with one of the conductors of the transmission line TL.

The second output stage of FIG. 4 comprises transistors N11 to N16 and inverters I4 to I6. The drains of the transistors N11, N13 and N15 are connected to the upper power supply node at an upper power supply potential Vbh. The sources of transistors N11, N13 and N15 are connected to a second output terminal Outn for connection with a second conductor of the symmetrical transmission line TL. The drains of transistors N12, N14 and N16 are connected with the second output terminal Outn. The sources of transistors N12, N14 and N16 are connected with the lower power supply node at the lower power supply potential Vbl. The input of inverter I4 is connected with the gate of transistor N11. The output of inverter I4 is connected with the gate of transistor N12. The input of inverter I5 is connected with the gate of transistor N13. The output of inverter I5 is connected with transistor N14. The input of inverter I6 is connected with the gate of transistor N15. The output of inverter I6 is connected with the gate of transistor N16. Similar to the first output stage, W1, W2 and W3 denote the channel widths of each of the transistors of the second output stage. Regarding the channel width of the transistors N11 to N16, reference is made to the description of FIGS. 2 and 3. The transistors N11, N13 and N15 constitute a first controllable impedance circuit of the second output stage while the transistors N12, N14 and N16 constitute a second controllable impedance circuit of the second output stage. For each transistor in the first impedance circuit there exists a transistor corresponding in the second impedance circuit, transistors corresponding to each other having the same channel width. Transistors corresponding to each other in the first impedance circuit and the second impedance circuit receive complementary gate control signals, in this embodiment generated by respectively associated inverters I4 to I6.

B1, B2 and B3 denote inputs for respective bits of a multibit output level control signal for controlling the output level at the second output terminal Outn. Both output level control words (A3, A2, A1) and (B3, B2, B1) are provided by a control circuit in accordance with a data input signal and the history of the date input signal, as has been described in connection with FIG. 1. In order to achieve a symmetrical output signal Uout across the output terminals Outp and Outn of the output buffer circuit according to FIG. 4, the control word (B3, B2, B1) may be simply the complement of the control word (A3, A2, A1). That is, B1, B2 and B3, respectively, may be the logical inverse of A1, A2 and A3, respectively.

Reference signs X and Y in FIG. 4 represent the input terminals of a receiver connected to the transmission line TL. The receiver circuitry is represented by a termination impedance RT. The receiver circuitry can be conventional and is as such not a part of the present invention.

While the embodiment of FIG. 4 comprises two output stages each having three pairs of transistors corrresponding to each other and associated control logic, it will be appreciated that the number of pairs of corresponding transistors in each output stage can be any number equal to or greater than 2, depending on the desired order of pre-emphasis in the output signal Uout to be generated by the output buffer circuit.

Since in the embodiment shown in FIG. 4, exactly one transistor in each pair of transistors corresponding to each other is in the ON-state at any time, the output impedance across the output terminals Outp and Outn will remain constant, independent from the time varying output potential difference Uout across the output terminals Outp and Outn. Preferably, the channel widths W1 to Wn of the transistors of the output stages shown in FIG. 4 are designed to be in a binary weighted relation, i.e. W(n)=2×W(n−1)= . . . =$2^{n-1}$×W(1). In this case the output signal amplitude Uout will have a linear relation to the output level control words, as shown in FIG. 3.

Figure 5:
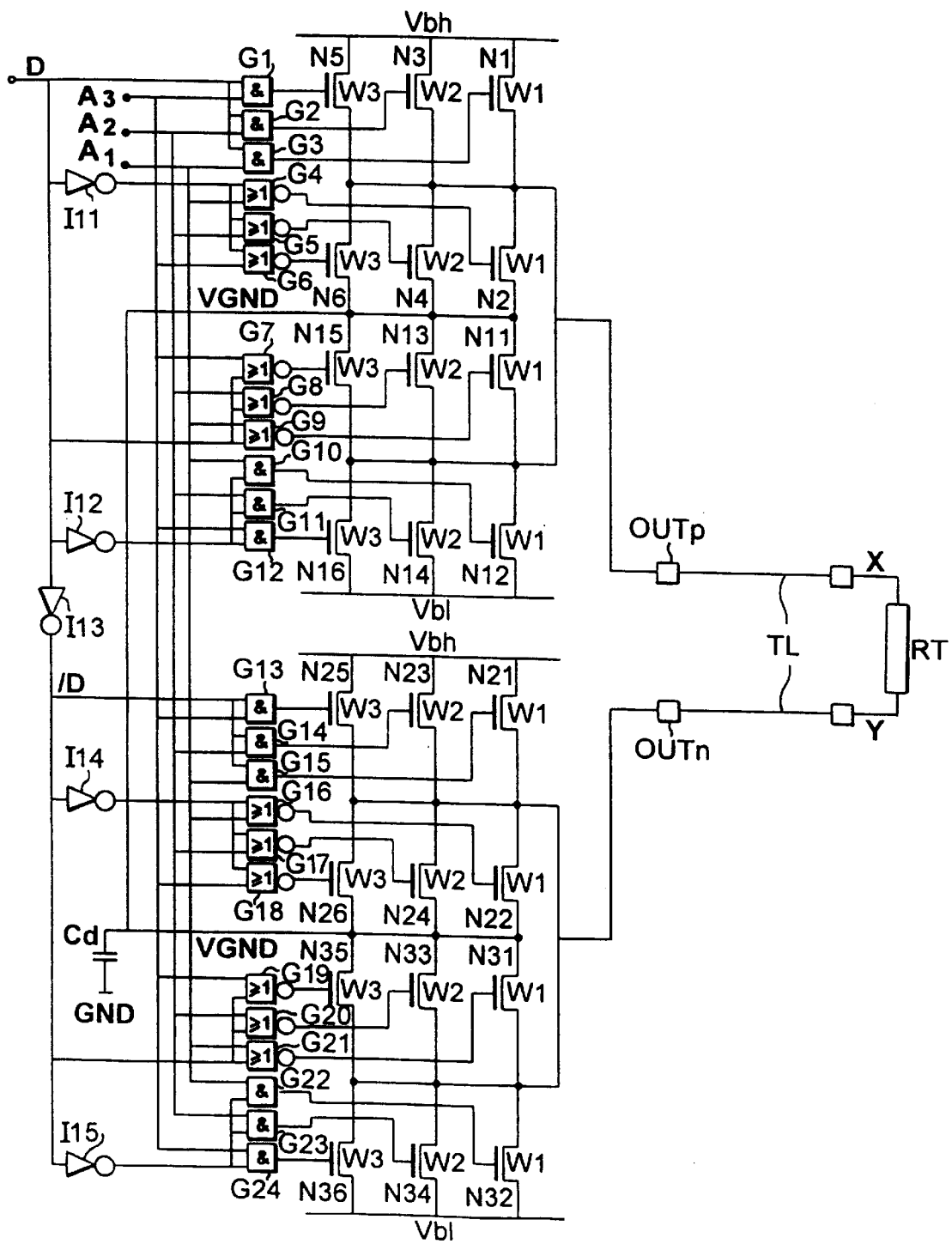
FIG. 5 shows a third embodiment of an output buffer circuit according to the present invention.

FIG. 5 shows a third embodiment of an output buffer circuit according to the present invention.

The output buffer circuit according to FIG. 5 drives a symmetrical transmission line TL connected to output terminal Outp and Outn of the output buffer circuit, similar to FIG. 4. This embodiment comprises a first output stage including the transistors N1 to N6, a second output stage including the transistors N11 to N16, a third output stage N21 to N26 and a fourth output stage N31 to N36. Each output stage comprises a first impedance circuit and a second impedance circuit, each impedance circuit comprising a plurality of transistors the drain source paths of which are connected in parallel. The gates of the transistors of each impedance circuit receive respective control signals for turning the respective transistors ON or OFF. In the ON-state, each transistor essentially behaves like a linear impedance with an impedance value determined by design parameters like the channel width and the channel length of the transistor. The drain source path of a transistor in the OFF-state is essentially non-conducting.

In the embodiment of FIG. 5, the first impedance circuit of the first output stage consists of transistors N1, N3 and N5. The first impedance circuit is connected between an upper power supply node supplying an upper power supply potential Vbh and the output terminal Outp of the output buffer circuit. The second impedance circuit of the first output stage consists of the transistors N2, N4 and N6 and is connected between the output terminal Outp and an intermediate node at a potential VGND. The first impedance circuit of the second output stage consists of the transistors N11, N13 and N15 and is connected between the node at VGND and the output terminal Outp. The second impedance circuit of the second output stage consists of the transistors N12, N14 and N16 and is connected between Outp and a lower power supply node at a lower supply potential Vbl. The intermediate potential VGND can be between the upper supply potential Vbh and the lower power supply potential Vbl.

The first impedance circuit of the third output stage consists of the transistors N21, N23 and N25 and is connected between the upper supply node at Vbh and the second output terminal Outn of the output buffer circuit. The second impedance circuit of the third output stage consists of the transistors N22, N24 and N26 and is connected between the second output terminal Outn and the intermediate node supplying VGND. The first impedance circuit of the fourth output stage consists of the transistors N31, N33 and N35 and is connected between VGND and the second output terminal Outn. Finally, the second impedance circuit of the fourth output stage is connected between Outn and the lower power supply node at Vbl. In each impedance circuit, the transistors constituting the respective impedance circuit have their drain source paths connected in parallel. Each transistor receives at its gate a control signal from a control circuit, for turning the respective transistor ON or OFF. In the On-state, the drain source path essentially behaves like a linear impedance with an impedance value in accordance with design parameters like the channel width and the channel length of the respective transistor. In the OFF-stage, the drain source path is essentially non-conducting. G1 to G24 and I11 to I15 in FIG. 5 together with an output level control word generator circuit described in connection with FIG. 1, constitute a control circuit for generating signals controlling the impedances of each of the impedance circuits. D denotes the input data signal while A1 to A3 denote inputs for the respective bits of an output level control word from the output level control circuit. In FIG. 5, logic gates and inverters are connected such that depending on the logical level of the data input signal D, either the first and the fourth output stage are active while the second and the third output stage are inactive or the first and the fourth output stage are inactive while the second and the third output stage are active. An output stage being inactive means that both impedance circuits of said output stage are in the non-conducting or high impedance state. Similar to the previous embodiments, each output stage includes two corresponding transistors designed to have the same ON impedance, one of these transistors being in the first impedance circuit and the other of the two corresponding transistors being in the second impedance circuit. In an active output stage according to FIG. 5, in each pair of corresponding transistors one of the transistors is in the ON-state while the other transistor is in the OFF-state. Which of the transistors is ON and which is OFF is determined by the output level control word (A3, A2, A1).

In the embodiment according to FIG. 5, the output impedance between the output terminals Outp and Outn is kept constant by means of controlling the impedance circuits of each of the first to fourth output stages such that for each of the output terminal Outp and Outn, the sum of the conductances connecting the respective output terminal to Vbh, to Vbl and to VGND is the same regardless the value of the output level control word (A3, A2, A1) and the logical level of the data input signal. In this way, the differential output impedance between Outp and Outn is independent of the output amplitude generated by the output buffer circuit of FIG. 5.

The power supply node VGND may be but need not be connected to a power supply circuit for generating the potentials Vbh, VGND and Vbl. The control circuit for controlling the impedances of the first impedance circuit and the second impedance circuit of each of the four output stages according to the embodiment of FIG. 5 is preferably adapted to control these impedances such that the first impedance circuit of one of the active output stages and the second impedance circuit of the other active output stage take the same impedance value.

In the specific embodiment of the control circuit for controlling the impedance circuits of the output stages shown in FIG. 5, G1 to G3, G10 to G15 and G22 to G24 respectively denote AND-gates with two inputs. G4 to G9 and G16 to G21 respectively denote NOR-gates having two inputs. A first input of each of the gates G1 to G3, G7 to G9, G16 to G18 and G22 to G24 receive the data input signal D. A first input of each of the gates G4 to G6, G10 to G15 and G19 to G21 receives the inverted data input signal/D which is obtained from the inverters I11, I12 and I13. The second input of each of the gates G3, G4, G9, G10, G15, G16 and G21, G22 receives the bit A1 of the output level control word (A3, A2, A1) from the output level control circuit. The second inputs of the gates G2, G5, G8, G11, G14, G17, G20 and G23 receive bit A2 of the output level control word. The second inputs of the gates G1, G6, G7, G12, G13, G18, G19 and G24 receive bit A3 of the output level control word. The outputs of the gates G1, G2 and G3, respectively, provide signals to the respective gates of the transistors N5, N3 and N1, respectively. The outputs of gates G4, G5 and G6, respectively, provide signals to the respective gates of the transistors N2, N4 and N6, respectively. The outputs of the gates G7, G8 and G9, respectively provide signals to the respective gates of the transistors N15, N13 and N11, respectively. The outputs of the gates G10, G11 and G12, respectively, provide signals to the respective gates of the transistors N12, N14 and N16, respectively. The outputs of the gates G13, G14 and G15, respectively provide signals to the respective gates of the transistors N25, N23 and N21, respectively. The outputs of the gates G16, G17 and G18, respectively, provide signals to the respective gates of the transistors N22, N24 and N26, respectively. The outputs of the gates G19, G20 and G21, respectively, provide signals to the respective gates of the transistors N35, N33 and N31, respectively. The outputs of the gates G22, G23 and G24, respectively, provide signals to the respective gates of the transistors N32, N34 and N36, respectively.

Cd in FIG. 5 denotes an optional decoupling capacitor connected to the intermediate node VGND. If the intermediate node VGND is a point of low impedance for signal frequencies, e.g. by means of providing the decoupling capacitor Cd to signal ground, the output buffer circuit according to the embodiment of FIG. 5 furthermore provides a constant common mode output impedance that is independent of the output amplitude across the output terminals Outp and Outn. If this independency of the common mode output impedance from the signal amplitude at the output terminals is desired, the intermediate note VGND may be decoupled by means of a decoupling capacitor Cd to any of the low impedance power supply potentials Vbl and Vbh. In the alternative or in addition such a decoupling capacitor, the intermediate node VGND may be connected to a power supply source that provides a potential e.g. of (Vbh+Vbl)/2.

The embodiment of FIG. 5 is advantageous in that for a given differential output impedance and given output signal amplitudes, the total power consumption of the output stages of FIG. 5 is about half as large as the power consumption of the embodiment according to FIG. 4. While in the embodiment of FIG. 4, the maximum current within each output stage from Vbh to Vbl is maximum when the differential output amplitude across the output terminals Outp and Outn is at its minimum value, in the embodiment according to FIG. 5 the internal peak current through the output stages from Vbh to Vbl occurs when the differential output signal takes a medium level, i.e. when the first and second impedance circuits within the active output stages take the same impedance value. Since the potential difference across each active output stage is only half of the potential difference across the output stages in the embodiment of FIG. 4, the internal current in the output stages of FIG. 5 will be half as large as in the embodiment of FIG. 4.

Regarding the number of pairs of corresponding transistors in each output stage and the channel width of each of the transistors of the output stages, reference is made to the previous embodiments in order to avoid repetitions.

Figure 6:
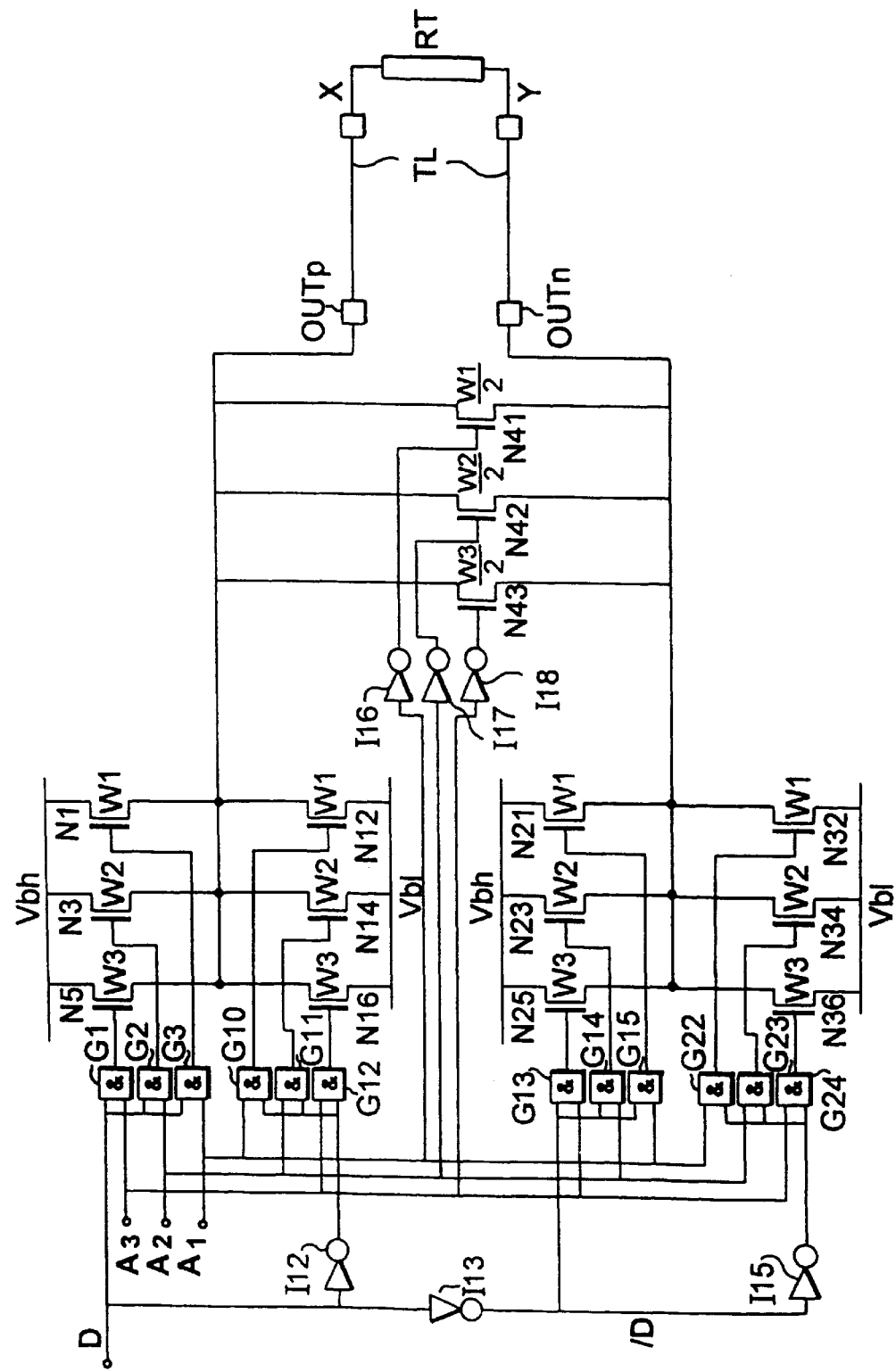
FIG. 6 shows a fourth embodiment of an output buffer circuit according to the present invention.

FIG. 6 shows a fourth embodiment of an output buffer circuit according to the present invention. In this Figure, elements similar to elements of the third embodiment have been denoted with the same reference numerals. With regard to these elements, reference is made to the description of FIG. 5 in order to avoid repetitions.

The fourth embodiment shown in FIG. 6 provides an output buffer circuit for driving a symmetrical transmission line TL. This embodiment comprises a first output stage including a first impedance circuit connected between Vbh and the first output node Outp. The first output stage furthermore comprises a second impedance circuit connected between the first output node Outp and the lower power supply potential Vbl. The first impedance circuit of the first output stage is constituted by a parallel connection of the drain source paths of transistors N1, N3 and N5. The second impedance circuit of the first output stage is in this embodiment constituted by a parallel connection of the drain source paths of transistors N12, N14 and N16. The output buffer circuit according to FIG. 6 furthermore comprises a second output stage having a first impedance circuit connected between Vbh and the second output terminal Outn, and furthermore having a second impedance circuit connected between Outn and Vbl. The first impedance circuit is in this embodiment constituted by a parallel connection of the drain source paths of transistors N21, N23 and N25. The second impedance circuit of the second output stage is in this embodiment constituted by a parallel connection of the drain source paths of transistors N32, N34 and N36. In each output stage, for each transistor in the first impedance circuit there is provided a corresponding transistor in the second impedance circuit, transistors corresponding to each other being designed to have the same ON-resistance. W1, W2 and W3 denote the channel widths of the transistors in each of the impedance circuits.

The embodiment of FIG. 6 furthermore comprises a controllable shunt impedance circuit connected across the output terminals Outp and Outn. The gates G1, G3, G10 to G15 and G22 to G24 together with the inverters I12, I13, I15 to I18 and the output level control word generator circuit described with reference to FIG. 1 constitute a control circuit for generating control signals for each of the impedance circuits of the first and the second output stage and for the shunt impedance circuit across Outp and Outn.

This control circuit is adapted to activate either the first impedance circuit of the first output stage and the second impedance circuit of the second output stage or the second impedance circuit of the first output stage and the first impedance circuit of the second output stage, depending on the logical state of the data input signal D. An activated impedance circuit can take an impedance value in accordance with the output level control word (A3, A2, A1) while in an inactivated impedance circuit all transistors are in the OFF-state. The control circuit controls the impedance of the first and second impedance circuits of the first and second output stages and the impedance of the shunt impedance circuit such that the sum of the conductance of the shunt impedance circuit, the conductance of the activated impedance circuit of the first output stage and the conductance of the activated impedance circuit of the second output stage are constant and independent from the signal output level across the output terminals Outp and Outn. In this way, the differential output impedance of the output buffer circuit of FIG. 6 will be independent from the output signal level.

In this embodiment the shunt impedance circuit comprises transistors N43, N42 and N41 the drain source paths of which are connected in parallel and across the output terminals Outp and Outn. For each pair of transistors corresponding to each other in the first output stage there exists a pair of corresponding transistors in the second output stage, one of these transistors being in the first impedance circuit of the second output stage and the other being in the second impedance circuit of the second output stage. For each of these quartets of corresponding transistors with the same ON resistance, a shunt transistor is provided across the output terminals Outp and Outn of the output buffer circuit. Each shunt transistor is designed to have an ON-impedance twice as large as the ON-impedance of the transistors in its associated quartet. Specifically, in the embodiment shown in FIG. 6 the shunt transistor N43 has a channel width half as large as the channel width of each of the transistors N5, N16, N25 and N36. Shunt transistor N42 has a channel width half as large as the transistors N3, N14, N23 and N34. Shunt transistor N41 has a channel width half as large as the channel width W1 of the transistors N1, N12, N21 and N32.

In the embodiment of FIG. 6, the control circuit is adapted to control the transistors in the active impedance circuits of the first and second output stages in accordance with the data input signal and the history of the data input signal such that for each of said quartets of transistors and its associated shunt transistor, either the two transistors in the two active impedance circuits or the shunt transistor are in the ON-state. In the embodiment of FIG. 6, inverter I16 provides the gate of shunt transistor N41 associated with the quartets of corresponding transistors N1, N12, N21, N32 with a gate signal which is the logical inverse of the gate signals applied to the active transistors of this quartets. Mutatis mutandis, the output of inverter I17 is connected with the gate of transistor N42 in order to provide the gate of transistor N42 with a control signal which is the logical inverse of the gate signal applied to the active transistors of quartets N3, N14, N23, N34 associated with shunt transistor N42. The output of inverter I18 is connected with the gate of shunt transistor N43 and provides the gate of this shunt transistor with a control signal that is the logical inverse of the control signal applied to the gates of the active transistors in the associated quartets of transistors N5, N16, N25 and N36.

The output buffer circuit according to the embodiment of FIG. 6 achieves the same power savings as the embodiment of FIG. 5. The circuit of the fourth embodiment of FIG. 6 is less complex than the circuit of the third embodiment according to FIG. 5. The fourth embodiment is particularly advantageous if a constant common mode output impedance independent from the output signal amplitude across the output terminals Outp and Outn is not required.

The embodiment of FIG. 6 includes three transistors in each impedance circuit, in accordance with the three bits representation of the output level control word for representing the output signal. It will be appreciated that the number of transistors in each impedance circuit and the number of bits used for representing the output signal can be selected to be any number greater than or equal to 2, e.g. in accordance with the desired order of the pre-emphasis to be applied to the output signal. Similar to the previous embodiments, the channel widths of the transistors in each impedance circuit are preferably selected to have a binary weighted relation.

In the embodiments described with reference to FIGS. 2, 4, 5 and 6, a variation of the output amplitude in accordance with the desired pre-emphasis results in different internal currents through the output stages from Vbh to Vbl. If this current modulation of the supply current of the output buffer circuit is undesired, e.g. if other output buffer circuits for other signal channels are operated with the same power supply circuit, this current modulation can be suppressed by means of adding an active load connected in parallel to the respective output buffer circuit across Vbl and Vbh. Such active load can be controlled by the same signals which control the signal output amplitude of the output buffer circuit. The internal elements in the active load are dimensioned such that the total load of the power supply resulting from the output buffer circuit and the active load will be constant and independent from the varying output signal amplitude.

While in the above embodiments transistors belonging to the same pair have the same channel width, it can be advantageous to make the channel width of the upper transistor which is connected to the upper power supply potential Vbh, larger than the channel width of the lower transistor of the same pair that is connected to the lower power supply potential Vbl, in order to take account of the difference in the source potentials of the transistors in each pair and to compensate its effect on the respective ON impedances. Preferably, the channel width of the upper transistor is 5 to 20% larger than the channel width of the lower transistor.

Of course, the channel width of a transistor is but one parameter for controlling the ON impedance of a transistor given a certain gate source voltage. An adjustment of the channel length is equally well feasible for achieving a binary weighted relation of ON impedances and for compensating the effect resulting from different source potentials of the transistors in each pair.

All embodiments described above include NMOS transistors. The same principles of the invention apply mutatis mutandis to designs adopting PMOS transistors.

Although preferred embodiments of the system, apparatus and method of the present invention have been illustrated in the accompanying Drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. An output buffer circuit for transmitting digital signals over a transmission line, comprising:

an output stage, said output stage including a first impedance circuit connected to provide a first impedance between a first node for supplying an upper supply potential and an output terminal for connection with said transmission line in accordance with a first impedance control signal;

said output stage further including a second impedance circuit connected to provide a second impedance between a second node for supplying a lower supply potential and said output terminal in accordance with a second impedance control signal;

a control circuit, said control circuit adapted to receive a digital data input signal and further to generate said first and second impedance control signals in accordance with said digital data input signal; and said control circuit further adapted to generate said first and second impedance control signals such that (i) an impedance ratio between said first impedance generated by said first impedance circuit and said second impedance generated by said second impedance circuit takes one of at least three different predetermined values in accordance with a present state and a history of said digital data input signal and (ii) the sum of conductance provided by said first impedance circuit and conductance provided by said second impedance circuit is independent from said generated impedance ratios.

2. The output buffer circuit according to claim 1, wherein said first impedance circuit and said second impedance circuit each include at least two impedance elements connected in parallel, each of said impedance elements adapted to receive from said control circuit a respective element control signal for controlling conductance thereof.

3. The output buffer circuit according to claim 2, wherein for each of said impedance elements of said first impedance circuit an associated impedance element is provided in said second impedance circuit, associated impedance elements constituting impedance element pairs; and wherein said control circuit further adapted to generate said element control signals for said impedance elements of each of said impedance element pairs such that the sum of said conductances of said impedance elements of each of said impedance element pairs is independent from a ratio of respective impedances of said impedance elements of each of said impedance element pairs.

4. The output buffer circuit according to claim 2, wherein each of said impedance elements comprises a MOS transistor having a drain source path and a gate terminal connected to receive said element control signal for controlling impedance of said drain source path.

5. The output buffer circuit according to claim 4, wherein said transistors of each of said impedance element pairs have approximately the same channel width; and wherein said element control signals associated with each of said impedance element pairs are complementary digital control signals.

6. The output buffer circuit according to claim 5, wherein said channel widths of said transistors the of said respective impedance circuits are in a binary weighted relation to each other.

7. A system for driving a transmission line, comprising:

a control circuit, said control circuit for receiving a digital data input signal and for generating a plurality of impedance control signals in accordance with said digital data input signal;

a first impedance circuit, said first impedance circuit connected for providing a first impedance between an upper power supply node and an output terminal, said output terminal for connection to said transmission line, said first impedance circuit controllable in accordance with a first impedance control signal of said plurality of impedance control signals;

a second impedance circuit, said second impedance circuit connected for providing a second impedance between a lower power supply node and said output terminal, said second impedance circuit controllable in accordance with a second impedance control signal of said plurality of impedance control signals; and said control circuit further for generating said first and said second impedance control signals in accordance with a present state and a history of said digital data input signal such that a ratio of said first impedance and said second impedance takes one of at least three different predetermined values, wherein an output signal is generated at said output terminal with a pre-emphase distortion.

8. The system according to claim 7, wherein said control circuit is further for generating said first and said second impedance control signals such that the sum of the conductance provided by said first impedance circuit and the conductance provided by said second impedance circuit is independent from said generated impedance ratios.

9. The system according to claim 7, wherein said impedance circuits include a plurality of transistors, and each of said plurality of transistors includes a drain source path, said drain source paths connected in parallel, wherein said first impedance circuit and said second impedance circuit include corresponding transistors with each of said corresponding transistors having similar properties, said corresponding transistors further driven such that said corresponding transistor of one of said impedance circuits is switched OFF when said corresponding transistor of the other one of said impedance circuits is switched ON.

* * * * *